(12) United States Patent
Hjelset

(10) Patent No.: US 11,306,864 B1
(45) Date of Patent: Apr. 19, 2022

(54) MOBILE OBSERVATORY

(71) Applicant: Anders Hjelset, Oxie (SE)

(72) Inventor: Anders Hjelset, Oxie (SE)

(*) Notice: Subject to any disclaimer, the term of this patent is extended or adjusted under 35 U.S.C. 154(b) by 0 days.

(21) Appl. No.: 17/372,642

(22) Filed: Jul. 12, 2021

(51) Int. Cl.
| | |
|---|---|
| *F16M 11/32* | (2006.01) |
| *F16M 11/02* | (2006.01) |
| *F16M 11/42* | (2006.01) |
| *F16M 11/28* | (2006.01) |
| *G02B 23/20* | (2006.01) |
| *G02B 23/16* | (2006.01) |

(52) U.S. Cl.
CPC ............ *F16M 11/32* (2013.01); *F16M 11/42* (2013.01); *G02B 23/165* (2013.01); *G02B 23/20* (2013.01); *F16M 2200/044* (2013.01); *F16M 2200/048* (2013.01)

(58) Field of Classification Search
CPC .. F16M 11/32; F16M 11/42; F16M 2200/044; F16M 2200/048; F16M 2200/024; F16M 13/00; F16M 11/10; F16M 11/14; F16M 11/18; G02B 23/165; G02B 23/20; G03B 27/323
See application file for complete search history.

(56) References Cited

U.S. PATENT DOCUMENTS

| | | | |
|---|---|---|---|
| 4,019,716 A | 4/1977 | Smith | |
| 4,852,836 A * | 8/1989 | Kawazoe | F16M 11/32 248/168 |
| 5,318,313 A * | 6/1994 | Chapman | B60G 99/00 248/129 |
| 5,421,549 A * | 6/1995 | Richards | F16M 11/10 248/163.2 |
| 6,439,515 B1 * | 8/2002 | Powers | F16M 11/28 248/129 |
| 7,333,882 B2 | 2/2008 | Uchino et al. | |
| 7,989,756 B2 | 8/2011 | Koo et al. | |
| 2004/0195789 A1 * | 10/2004 | Christensen | F16M 11/245 280/35 |
| 2012/0019642 A1 | 1/2012 | Hillis et al. | |
| 2016/0131303 A1 * | 5/2016 | Hubbs | F16M 11/36 280/30 |
| 2019/0185182 A1 * | 6/2019 | Bei | B64G 1/16 |
| 2020/0231081 A1 | 7/2020 | Coons | |

FOREIGN PATENT DOCUMENTS

| | | |
|---|---|---|
| CN | 101439690 | 6/2010 |
| CN | 101886923 | 11/2010 |
| CN | 211289438 | 8/2020 |
| CN | 212900713 | 6/2021 |
| FR | 2992039 | 7/2016 |

\* cited by examiner

*Primary Examiner* — Tan Le (57) ABSTRACT

A mobile self-unloading observatory is presented for transporting observation equipment such as a telescope to a remote location, with a subsequent automatic setting up the equipment for observation. The observation equipment is transported on a suspended platform that protects the equipment against shock and vibrations. At the remote location, a self-leveling telescopic pier is extended to the ground under the chassis of the observatory, and released from being held within a frame of the observatory. The telescopic pier is extended towards the platform to support the observation equipment over the ground. The transportation, the setting up, and the teardown of the equipment may be performed without having to manually handle heavy or bulky objects.

12 Claims, 11 Drawing Sheets

MOBILE OBSERVATORY

TECHNICAL FIELD

The present disclosure relates to mobile mechanical devices and associated methods, and in particular to mobile observatories and related methods.

BACKGROUND

Observation equipment such as telescopes, theodolites, rangefinders, heavy cameras, etc. is used to observe, photograph, measure, or characterize terrestrial and/or sky objects. High-resolution observation equipment tends to be heavy, bulky, and generally difficult to transport and handle. Precise optical equipment tends to be fragile and expensive, requiring careful handling when setting up at a remote location, prepping for observation, or tearing down. High costs, big weight, and mechanical fragility are main reasons why large observation equipment tends to be stationary. For example, large telescopes are always stationary in that they require a heavy and stable mechanical support and precise positioning of their optical elements such as large and heavy mirrors. The encroaching light pollution makes astronomical observations increasingly difficult at many locations, increasing the motivation for night sky observation equipment to be mobile.

Difficulty of transportation and handling limits the mobile observation equipment to small handheld devices hand-mountable on light tripods. A reasonably small telescope optic may be hand-carried in a carrying case separately from a portable tripod. The optic and the tripod may be delivered to a remote location. The tripod may be manually unfolded and leveled, and the optic may be suitably mounted on the tripod. The observations, such as a visual observation, astrometry, photometry, photography, etc. may be then performed. Upon completion of the observations, the optic and the tripod are taken apart and stowed for subsequent transportation back to the original location. When a need arises to perform another observation at another remote location, the entire transportation, unfolding, setting up, observation, teardown, and transportation back to the original location needs to be repeated. The process may be tedious, especially when the observations are done at a nighttime, and the teardown needs to be performed in the morning after a sleepless night of making observations. The observer may be tired, and may not retain their usual level of physical strength and mental awareness needed to adequately handle fragile and/or heavy equipment.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 2A to 2D, FIG. 3, FIG. 9, and FIG. 10, similar reference numerals denote similar elements.

Observations at a remote location requires the observer to travel to the remote location with all their equipment suitably packed up for transportation, to set up at the remote location, and to tear down after performing the observations. Manual setting up of a tripod, mount, and other equipment such as a heavy telescope, photographic equipment, power supplies, computers, etc., as well as tearing down the setup upon completion of observation may be a physically demanding and unsafe procedure, especially in view of the observer getting tired and reducing their level of concentration at the end of observation.

In accordance with this disclosure, observation equipment may be suitably carried on a wheeled chassis, e.g. on a trailer towable by a car, in a manner that enables a safe transportation to the place of interest, a quick, repeatable, and safe installation of the equipment for the observations to be made, as well as quick, repeatable, and safe teardown of the equipment for subsequent transportation back to the observer's place of residence, or to another location if needed. To achieve this goal, the observation equipment may be mounted on a platform suspended within a frame by a plurality of spring-loaded shock/vibration dampers. A retractable pier may be mounted on the chassis under the platform in a manner that enables the extending of the pier towards the ground under the frame and level placement of the pier on the ground. The retractable pier may then be detached from its support in the frame and extended upwards to support and elevate the platform. The latter, together with the mounted observation equipment, becomes supported by the pier standing firmly on the ground, the pier being mechanically decoupled from the chassis and the frame. When the observations are complete, the whole process may be preformed in reverse order to flexibly suspend the equipment in the frame, and to retract the pier back into the frame for transportation to the observer's place of origin or residence, or to a next observation location as the case may be. The transportation, the setting up, and the teardown of the equipment may be performed in a semi-automatic mode, without having to manually handle heavy or bulky objects.

In accordance with the present disclosure, there is provided a mobile observatory comprising a frame mountable on a wheeled chassis for transporting the frame to a destination location, and a platform flexibly suspendable within the frame. The platform is configured to support observation equipment in a transportation mode to the destination location. A pier is detachably supportable by at least one of the frame or the wheeled chassis. The pier is configured to extend to ground under the platform at the destination location while being supported, to decouple from the frame or the wheeled chassis, and to support the platform over the ground in an observation mode.

The pier may include a plurality of extendable legs at a distal end of the pier. The extendable legs of the plurality of extendable legs are configured to independently contact the ground and support the pier on the ground after the pier has been decoupled from the frame or the wheeled chassis in the observation mode. The pier may further include a mounting surface at a proximal end of the pier, for supporting the platform in the observation mode, and a telescopic actuator for changing a length of the pier between the proximal and distal ends of the pier, i.e. between the mounting surface and the plurality of extendable legs. Each extendable leg of the plurality of extendable legs may include a locking mechanism for independently locking each extendable leg of the plurality of extendable legs after contacting the ground. The locking mechanism may include a tilt-back lever actuated by application of force from the pier to each extendable leg of the plurality of extendable legs. The tilt-back lever of each extendable leg of the plurality of extendable legs may be actuated by a downward force applied by the pier when the pier shifts down under gravity upon releasing from being supported by the frame or the wheeled chassis.

In some embodiments, the mobile observatory includes a plurality of dampers for suspending the platform in the frame when in the transportation mode. The platform may include an adjustment mechanism for adjusting a position of center of gravity of the platform with the observation equipment mounted on the platform relative to a virtual suspension point of the platform when the platform is suspended by the plurality of dampers. Each damper of the plurality of dampers may include serially coupled a vibration absorber for absorbing vibrations and a shock absorber for absorbing shocks. One of the vibration absorber or the shock absorber may be coupled to the platform, and the other of the vibration absorber or the shock absorber may be coupled to the frame. The vibration absorber may include e.g. an external shell body, an inner body within the external shell body, a compressible layer supporting the inner body within the external shell body, and a supporting wire coupled to the inner body and running through the compressible layer and the inner body.

In accordance with the present disclosure, there is provided a self-adjustable support for supporting observation equipment over ground. The self-adjustable support includes a pier configured for being held over the ground at a controllable distance from the ground, and a plurality of extendable legs at a distal end of the pier. The extendable legs of the plurality of extendable legs are configured to independently contact the ground and support the pier after the pier is released from being held over the ground.

In some embodiments, each extendable leg of the plurality of extendable legs includes a locking mechanism for independently locking each extendable leg of the plurality of extendable legs upon contacting the ground. The locking mechanism may include a tilt-back lever actuated by application of force from the pier when the pier shifts down under gravity. For example, the locking mechanism may include: a supporting member having a groove, a sliding block coupled to the tilt-back lever, for sliding in the groove of the supporting member, and a locking block coupled to the sliding block for locking the locking block and the sliding block within the supporting member when the force is applied to the tilt-back lever. A spring-loaded pullback mechanism may be provided for facilitating the extension of each extendable leg of the plurality of extendable legs towards the ground. A spool may be provided for unlocking the locking mechanism and retracting each one of the plurality of extendable legs when the pier is lifted over the ground, by pulling on the tilt-back levers of the extendable legs of the plurality of extendable legs.

In accordance with the present disclosure, there is further provided a method for using observation equipment. The method includes transporting the observation equipment to a destination location on a platform of a mobile observatory disclosed herein. The platform is flexibly suspended within a frame mounted on a wheeled chassis of the mobile observatory. Upon arriving at the destination location, a pier supported in the frame is coupled to ground under the platform of the mobile observatory. The pier is decoupled from its support in the frame. The platform with the observation equipment may then be supported by the pier, which at this point is decoupled from its support in the frame; the pier rests on the ground under the mobile observatory.

Coupling the pier to the ground may include using a telescopic actuator of the pier to extend a distal end of the pier towards the ground underneath the platform while the pier remains supported by at least one of the frame or the wheeled chassis; and extending a plurality of extendable legs to the ground. Each extendable leg of the plurality of extendable legs independently rests on the ground at a height level specific to a location of the extendable leg on the ground. Coupling the pier to the ground may further include using a locking mechanism to independently lock each extendable leg of the plurality of extendable legs resting on the ground at the specific height level. The locking mechanism is actuated or energized by a shift of the pier down under gravity when the pier is decoupled from its support by at least one of the frame or the wheeled chassis. Upon actuating the locking mechanism, the telescopic actuator may be used to extend the pier towards the platform to support the platform and the observation equipment on the platform of the mobile observatory over the ground.

Figure 1:
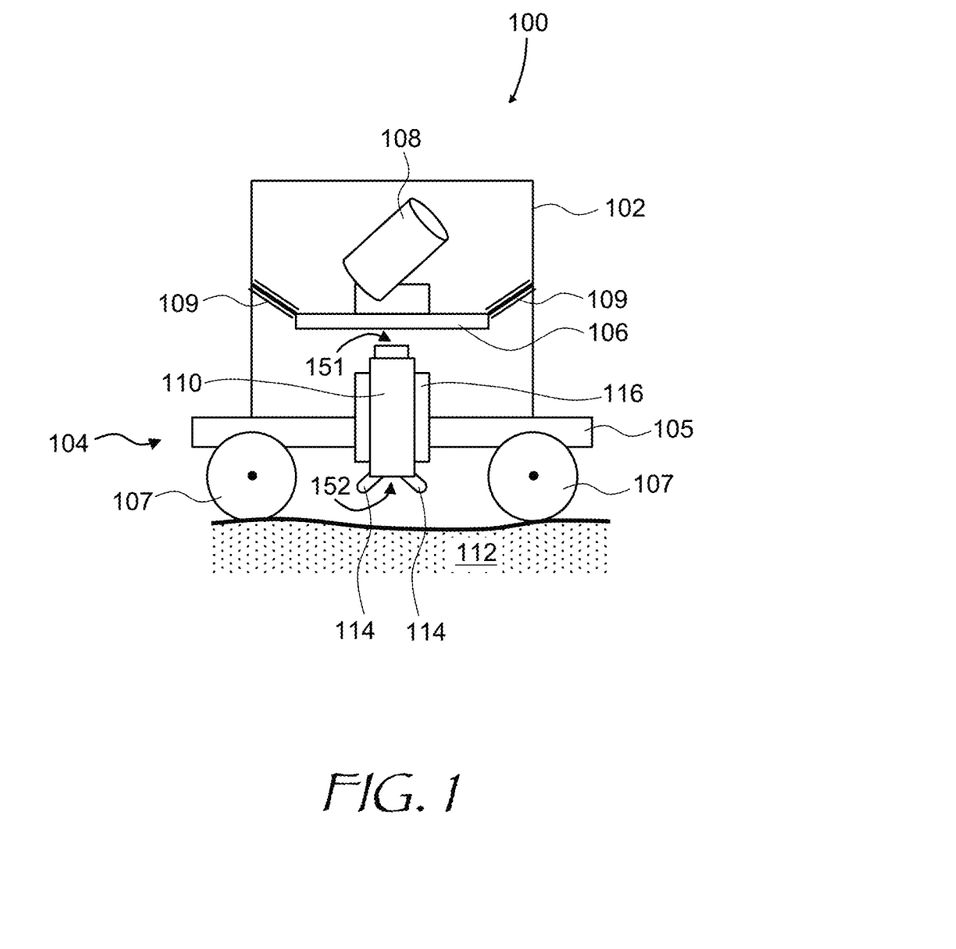
FIG. 1 is a schematic side cross-sectional view of a mobile observatory of the present disclosure.

Referring now to FIG. 1, a mobile observatory 100 includes a frame 102, e.g. a rectangular frame of metal tubing, which may be welded or joined together by a plurality of metal corner pieces or joint members. The frame 102 may be mounted on a wheeled chassis 104 such as a road trailer for example, for transporting the frame 102 to a destination location. The destination location may be a remote location such as a dark site, a public park, a wilderness area, a mountain, a future or present construction site, a land area to be surveyed, etc. More generally, the destination location may be any location where observations, including photography, need to be performed with heavy or bulky observation equipment. The wheeled chassis 104 may include a base 105 and wheels 107 rotatably coupled to the base 105. The wheeled chassis 104 may be towable by a vehicle, or may be self-propelled in some embodiments.

A platform 106 may be flexibly suspended within the frame 102. The platform 106 is configured to support observation equipment 108 in a transportation mode, that is, in a mode in which the observation equipment 108 is transported to the destination location, substantially without damaging or compromising the equipment while in transport. A plurality of dampers 109 is provided for suspending the platform 106 carrying the observation equipment 108 within the frame 102 when in the transportation mode.

A pier 110 is detachably supported in the frame 102. For example, the pier 110 may be supported by pier supports 116 mounted to the wheeled chassis 104. In some embodiments, the pier 110 may be supported by the frame 102, or both by the wheeled chassis 104 and the frame 102, directly or by dedicated support members such as posts, clamps, ball-pin connectors, etc. The pier 110 may be configured to extend to ground 112 under the platform 106 at the destination location while being supported by the frame 102, the wheeled chassis 104, and/or dedicated structures as the case may be; to decouple from the frame 102 or the wheeled chassis 104 upon firm placement on the ground 112; and to support the platform 106 over the ground 112 in an observation mode while being detached from the frame 102 and the wheeled chassis 104. The detachment from the support 116 enables the pier 110, the platform 106, and the observation equipment 108 to be mechanically decoupled from nudges, shifts, vibrations, etc., exerted by the frame 102 and the wheeled chassis 104 when the mobile observatory 100 is in the observation mode. Herein, the term "observation mode" refers to a mode that enables the observations, which include without limitation visual observations, visual/infrared/UV photography, ranging including measuring geometrical angles, distances, object locations, image brightness or photometric measurements, etc., to be performed. A typical requirement for the observation mode is to provide a stable and solid support of the observation equipment 108 by mechanically solidly coupling the observation equipment 108 to the ground, that is, excluding wheels of the wheeled chassis 104 which would provide too soft and wobbly a support for the observations to be reliably performed, if the wheel support is to be used alone, or even when the chassis 104 is supported by jacks at all four corners raising the wheels 107 over the ground. To provide required support over the ground 112, the pier 110 may include a plurality of extendable legs 114 at a distal end 152 of the pier 110, i.e. at the end facing outside of the frame 102 and downwards, into the ground 112. A proximal end 151 of the pier 110 faces the platform 106 that the proximal end 151 supports in the observational mode of the mobile observatory 100.

Figure 2A:
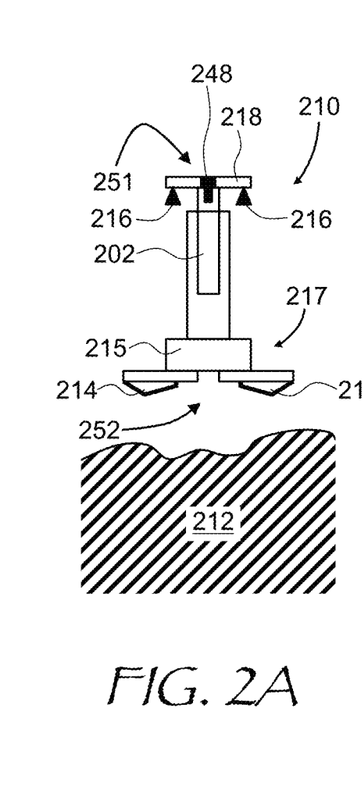
FIGS. 2A to 2D are schematic side cross-sectional views of a pier embodiment of the mobile observatory of FIG. 1 illustrating the process of automatic leveling on an uneven ground.

The operation of an extendable pier of this disclosure is illustrated in FIGS. 2A to 2D. Referring initially to FIG. 2A with further reference to FIG. 1, a pier 210 is an embodiment of the pier 110 of FIG. 1. The pier 210 is extendable, i.e. it can increase or decrease its height (or in other words, the length in the vertical direction in FIGS. 2A to 2D). To that end, the pier 210 may include a telescopic actuator 202, which may change the length of the pier 210 between its proximal 251 and distal 252 ends as the pier 210 is held over ground 212. The telescopic actuator 202 may be motorized, i.e. it may include its own motor, or it may be passively driven with an external tool such as a hand drill, for example. A mounting surface 218 may be provided at the proximal end 251 of the pier 210, that is, at an end facing the platform 106 in FIG. 1, for supporting the platform 106 when in the observation mode. In the embodiment of FIGS. 2A to 2D, the pier 210 is held at support locations 216 of a base structure supported by at least one of the frame 102 or the wheeled chassis 104. The base structure itself is not shown in FIGS. 2A to 2D for brevity. Examples of a base structure will be provided further below.

The pier 210 includes a plurality of extendable legs 214 at the distal end 252 of the pier 210. In the embodiment shown, the extendable legs 214 are supported by a tripod base 215 mounted to the distal end 252 of the extendable pier 210. There are the total of three extendable legs 214 in this illustrative non-limiting example. Together with the tripod base 215, the extendable legs 214 form a tripod 217 mounted to the distal end of the extendable pier 210 and supporting the extendable pier 210 over the ground 212.

The extendable legs 214 are individually and independently extendable towards the ground 212 while the pier 210 is held over the ground 212 at a controllable distance from the ground 212. Herein, the term "individually and independently extendable" means that, although the extendable legs 214 may be actuated by a common mechanism that provides the extension and/or retraction of the extendable legs 214, the extendable legs 214 may individually adjust to the local height or profile of the ground 212. In operation, the telescopic actuator 202 of the pier 210 extends the distal end 252 of the pier 210 towards the ground 212 underneath the platform 106 (FIG. 1) while the pier 210 (FIG. 2A) remains supported at the support locations 216 of the base structure, as can be seen by comparing FIG. 2B to FIG. 2A. The direction of extension of the distal end 252 of the pier 210 is illustrated in FIG. 2B with an arrow 249.

Figure 2B:
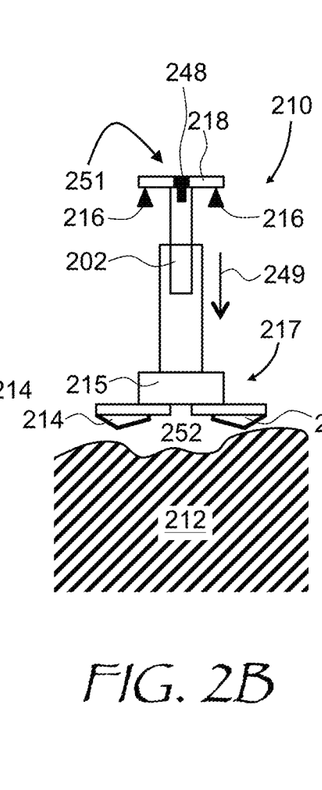
Figure 2C:
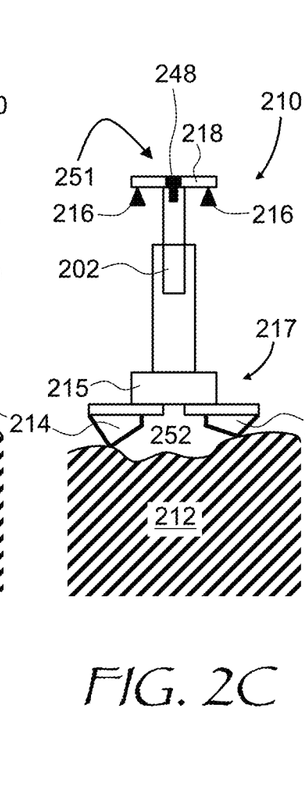
Figure 2D:
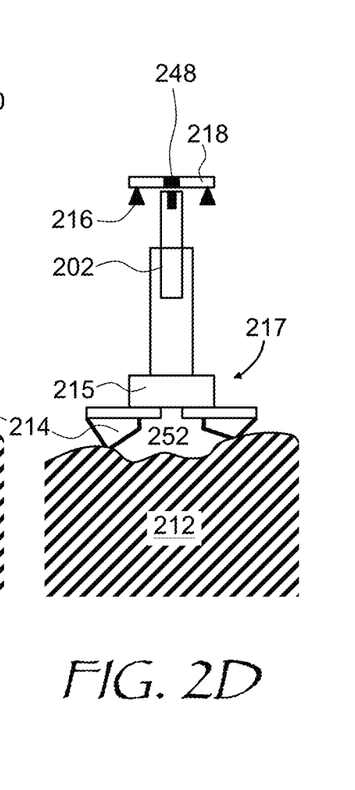

From the position of the pier 210 illustrated in FIG. 2B, the extendable legs 214 may be individually and independently extended to rest on the ground 212, as can be seen by comparing FIG. 2C to FIG. 2B. In FIG. 2C, each extendable leg 214 independently rests on the ground 212 at a height level specific to a location of that extendable leg 214 on the ground 212. Once all extendable legs 214 are firmly positioned on the ground 212, the extendable legs 214 may be locked in their respective positions by a locking mechanism. The function of the locking mechanism, which will be described in detail further below, is to independently lock each extendable leg 214 resting on the ground 212 and adapting to the height profile of the ground 212, as shown in FIG. 2C. The locking mechanism may be actuated by shift of the pier 210 under gravity when the pier 210 is decoupled from its support (FIG. 2D). The decoupling of the pier 210 may be achieved e.g. by providing a suitable connector 248 that detachably connects the top portion of the actuator 202 with the mounting surface 218. When the top portion of the actuator 202 disconnects from the mounting surface 218, the latter which remains supported by the frame/chassis at the support locations 216. A ball-pin cylindrical connector may be used as the detachable connector 248.

Figure 3:
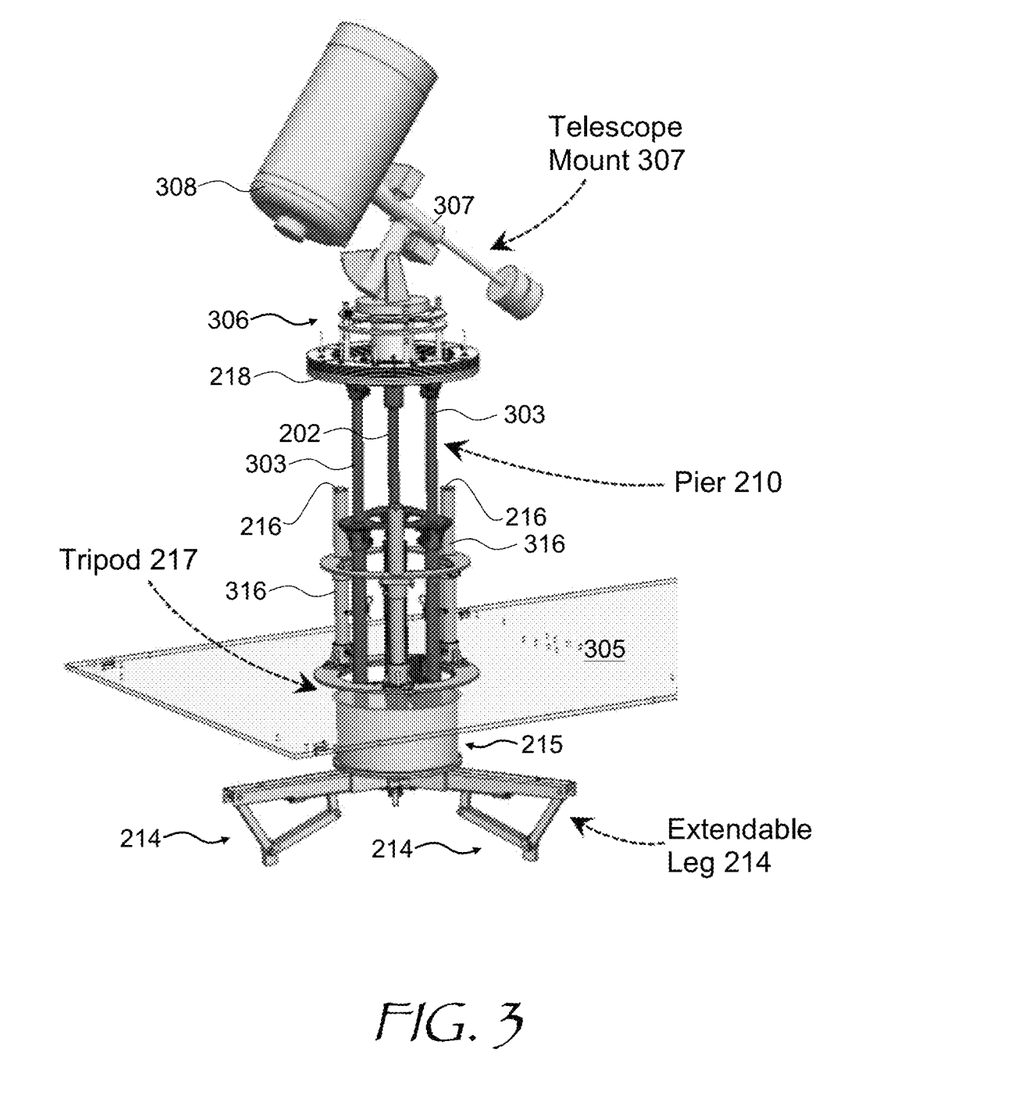
FIG. 3 is a three-dimensional view of the pier of FIG. 2, the pier supporting a platform with observation equipment (a telescope) mounted on the platform in an embodiment of the mobile observatory of FIG. 1.

Referring to FIG. 3, the pier 210 of FIG. 2 is illustrated in an extended position, with the mounting surface 218 (FIG. 3) supporting a platform 306 that holds a German equatorial mount 307 with a telescope 308 attached to the German equatorial mount 307. Other types of observation devices can be supported as well. A base structure 316 provides the support locations 216 to the pier 210 (FIG. 2). The base structure 316 (FIG. 3) includes a triad of posts and mounting rings connecting the posts. The base structure 316 is mounted to a base floor 305 of a wheeled platform, which is omitted in FIG. 3 for brevity. The pier 210 is extendable or retractable by actuating the actuator 202, which is mounted at the center of a triad of telescopic legs 303 disposed in an equilateral triangle in a complementary manner to the triad of supporting posts.

The telescopic legs 303 may be locked in position when extended or retracted to a required height of the pier 210. The function of the triad of telescopic legs 303 is to ensure parallel movement of the mounting surface 218 and/or the tripod 217 when the actuator 202 is actuated. The detachable connector 248 of FIG. 2D enables the actuator 202 to be completely disengaged from the mounting surface 218 and the platform 306 once the telescopic legs 303 are locked in position. Any potential actuator 202 torque or pressure that might otherwise interfere with the telescopic legs 303 that hold the platform 306 is thereby avoided, resulting in a very solid three-point support of the platform 306 over the ground. The pier 210 with the tripod 217 at its distal end serves as a self-adjustable support for supporting observation equipment, such as the telescope 308 on the German equatorial mount 307, over the ground.

Figure 4A:
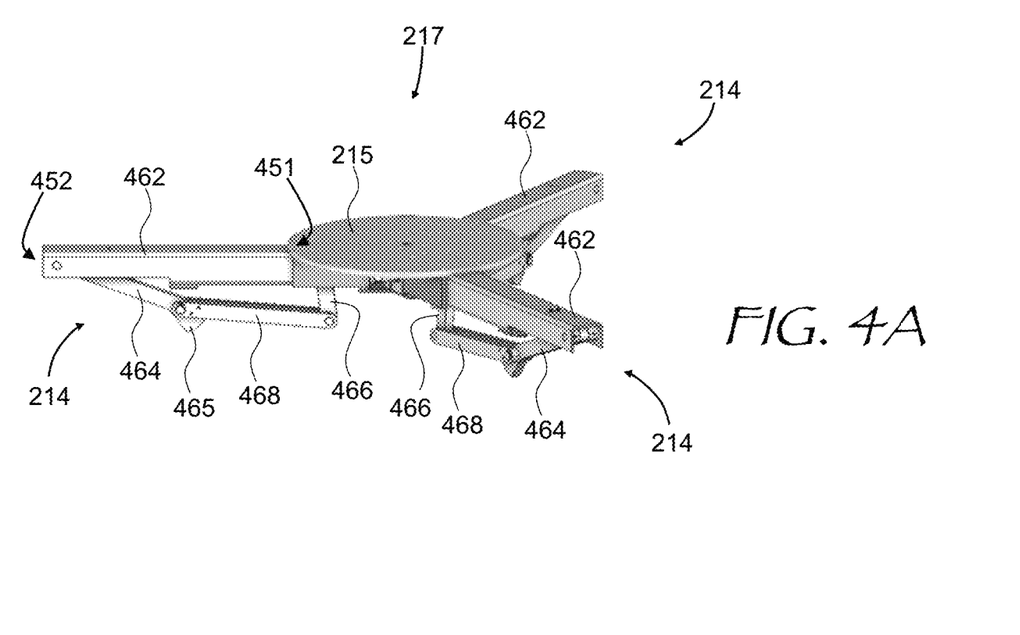
FIGS. 4A and 4B are three-dimensional views of a tripod portion of the pier of FIG. 3 in folded and unfolded configurations, respectively.
Figure 4B:
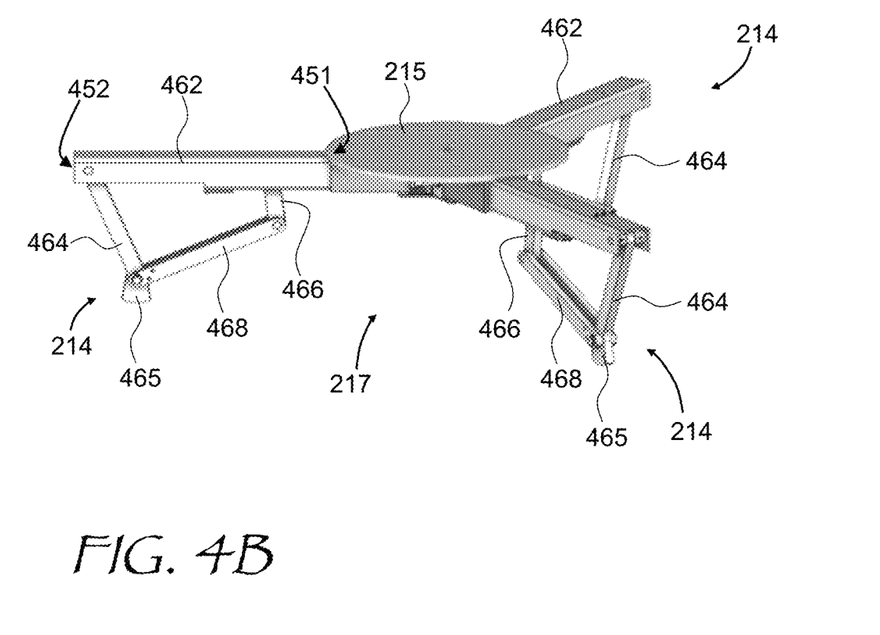
Figure 5A:
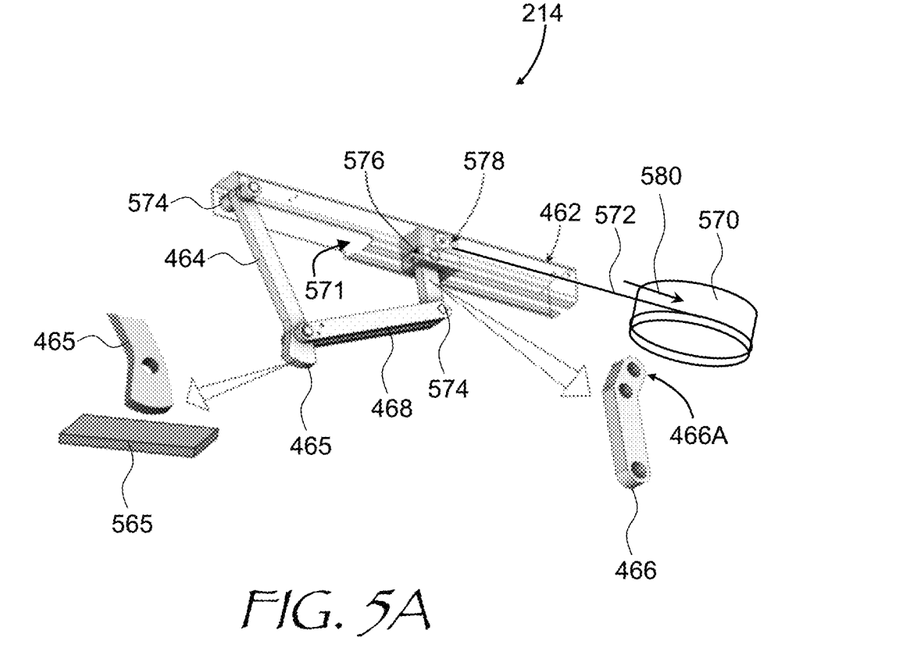
FIG. 5A is a three-dimensional detailed view of an extendable leg of the tripod of FIGS. 4A and 4B.
Figure 5B:
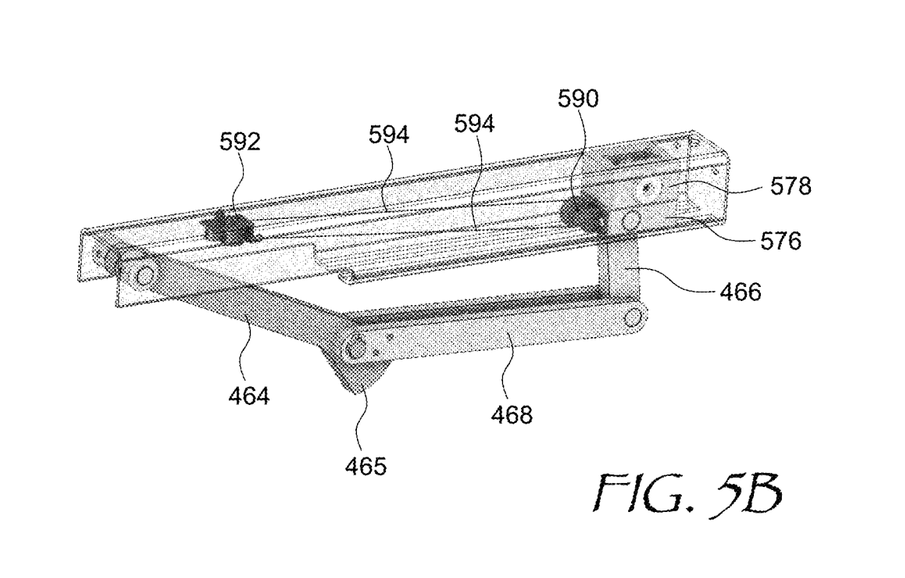
FIG. 5B is a three-dimensional detailed view of a spring-loaded pullback mechanism of the extendable leg of FIG. 5A.

An example implementation of the tripod 217 with lockable legs 214 is illustrated in FIGS. 4A and 4B. The lockable leg construction is illustrated in FIGS. 5A and 5B. In FIG. 4A, the tripod 217 is shown in folded or retracted position, and in FIG. 4B, the tripod 217 is shown in unfolded or extended position. Each leg 214 of the tripod 217 includes a straight supporting member 462 radially extending from the tripod base 215, a foot 464 hingedly mounted to the supporting member 462 at a distal end 452 of the supporting member 462, a tilt-back lever 466 hingedly mounted to the supporting member 462 at a proximal end 451 of the supporting member 462, and a joining bar 468 hingedly coupling tilt-back lever 466 to the foot 464 proximate a sole 465 of the foot 464. The legs 214 are retracted by pulling on the tilt-back levers 466 at locations 466A (FIG. 5A) towards the center of the base 215, and are extended to the ground by gravity and/or by a spring-loaded pullback mechanism (FIG. 5B) once the pulling on the tilt-back levers 466 at the locations 466A is released. Each leg 214 is configured to independently contact the ground and support the pier on the ground when in extended position.

The leg 214 construction is shown in more detail in FIG. 5A. The foot 464, the supporting member 462, the tilt-back lever 466, and the joining bar 468 are coupled by hinges 574. The supporting member 462 of each extendable leg 214 includes an inner groove or cavity 571. A sliding block 576 is coupled to the tilt-back lever 466 for sliding in the groove 571 of the supporting member 462. A locking block 578 is coupled to the sliding block 576 for locking the locking block 578 and the sliding block 576 within the groove 571 of the supporting member 462 when a force is applied to the tilt-back lever 466. The force may be applied from the pier 210 when the pier 210 shifts under gravity upon releasing from being supported as illustrated in the above FIGS. 2C and 2D. In other words, the tilt-back lever 466 of each extendable leg 214 is actuated by a downward force applied by the pier 210 when the pier 210 shifts down under gravity and acquires momentum that energizes the subsequent locking of each extendable leg 214. The groove 571 of the supporting member 462, the tilt-back lever 466, the sliding block 576, and the locking block 578 form a locking mechanism actuated by the downward force applied by the pier 210 pressing onto the supporting members 462 when the soles 465 are touching the ground 212 (FIGS. 2A to 2D) or support pads 565, e.g. pieces of plastic, which may be placed between the soles 465 of the feet 214 and the ground 212. The downward force causes the feet 464 to press onto the distal ends of the tilt-back levers 466 via the joining bars 468, causing the locking blocks 578 to get releasably locked in the respective grooves 571 by tilting out of alignment with the grooves 571. A winch or spool 570 may be provided for releasing the locking mechanism and retracting each one of the plurality of extendable legs 214 when the pier 210 is lifted over the ground 212, by pulling on a cord 572 wound onto the winch or spool 570 and coupled to the tilt-back levers 466 of the extendable legs 214. The pulling occurs in the direction of an arrow 580. The cord 572 may be coupled to the tilt-back levers 466 proximate corresponding locking blocks 578, or directly to the locking blocks 578. The winch or spool 570 may be located at a bottom of the base 215 of the tripod 217, and may have separate cords extending from individual sections of the spool 570 to ends of the tilt-back levers 466 of the respective legs 214, one cord per each leg. By rotating the spool 570 in the opposite direction, i.e. in the direction opposite to the pulling represented by the arrow 580, the legs 214 can extend downwards under gravity. In some embodiments, the extension of the extendable legs 214 may be facilitated by the spring-loaded pullback mechanism of FIG. 5B. The spring-loaded pullback mechanism includes a pulley 590 coupled to a rotary spring-loaded spool 592 with a pullback cord 594. The spring-loaded pullback mechanism may be helpful in overcoming sticking and/or excessive friction caused by dusty and/or sandy environment in which the extendable legs 214 may be operating. Furthermore, the spring-loaded pullback mechanism may reduce the tripod's falling distance when the drop-locking of the extendable legs 214 is activated by shifting of the pier 210 under gravity.

Figure 6:
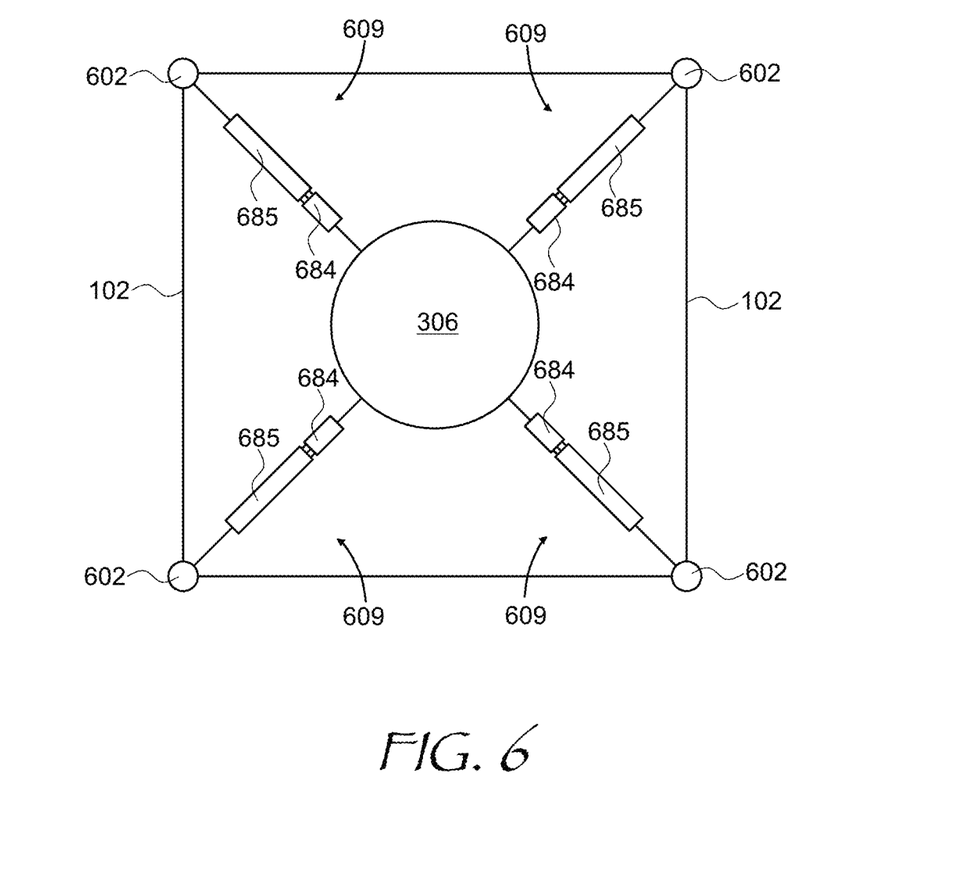
FIG. 6 is a schematic top view of a suspension platform mounted in the frame of the mobile observatory of FIG. 1.

The suspension apparatus for transporting the observation equipment in the transportation mode will now be described. Referring to FIG. 6 with further reference to FIGS. 1 and 3, the suspension platform 306 is mounted in the frame 102 of the mobile observatory 100 (FIG. 1). In FIG. 6, the frame 102 is assembled from a plurality of interconnected posts 602, which may include diagonal posts for extra rigidity. A plurality of dampers 609 is provided for suspending the platform 306 in the frame 102 when in the transportation mode. The platform 306 is suspended by four symmetrically disposed dampers 609. At least three symmetrically disposed dampers 609 may be provided.

Each damper 609 includes serially coupled a vibration absorber 684 for absorbing vibrations, including e.g. vibrations within 5 Hz 10 kHz frequency range, and a shock absorber 685 for absorbing low-frequency, high-amplitude shocks or jolts with a typical frequency spectrum of 0 Hz-10 Hz, for example a shock due to panic braking and emergency stopping the mobile observatory 100.

In the embodiment of FIG. 6, the vibration absorber 684 is coupled to the platform 306, and the shock absorber 685 is coupled to the frame 102. Opposite coupling is also possible, i.e. the vibration absorber 684 may be coupled to the frame 102, and the shock absorber 685 may be coupled to the platform 306. An example construction of the dampers 609 will be presented further below with reference to FIG. 8.

Figure 7:
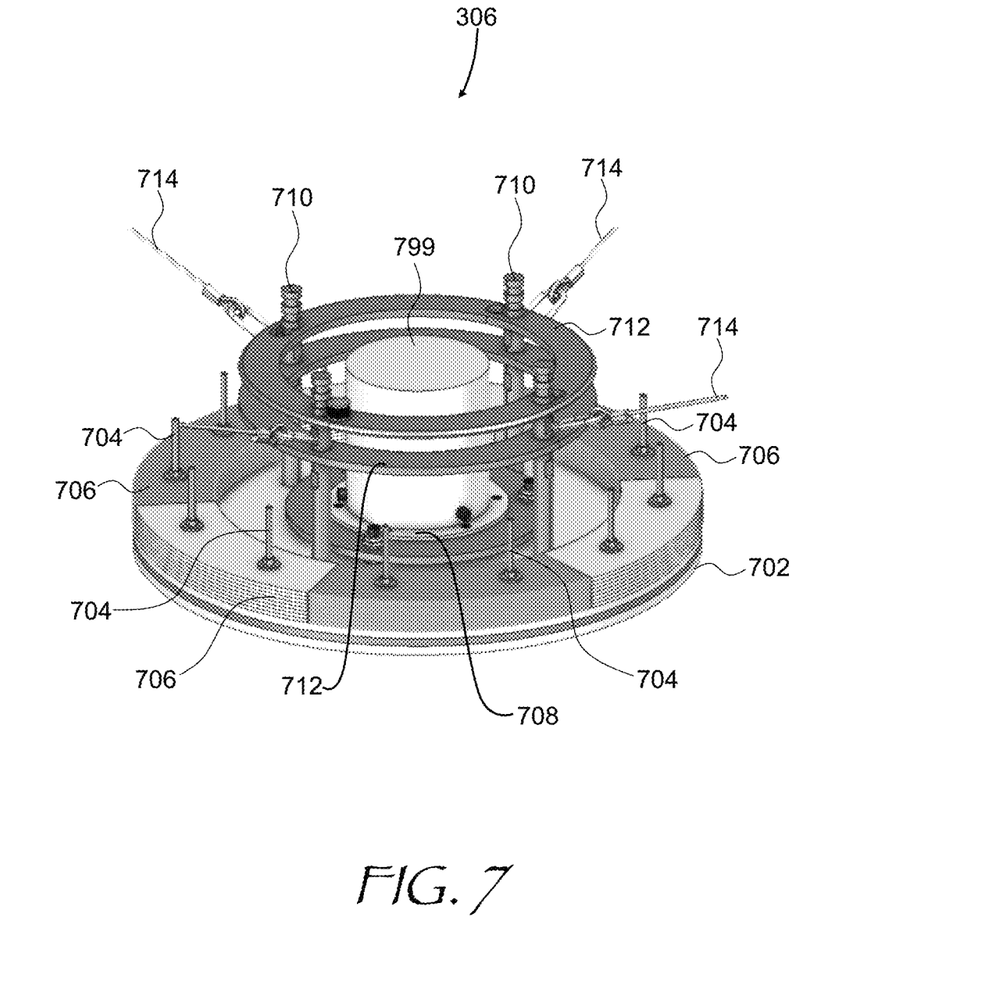
FIG. 7 is a three-dimensional view of the suspension platform with the virtual suspension point and center of gravity adjustments.

Referring now to FIG. 7, the suspension platform 306 is shown in more detail. In the illustrated non-limiting embodiment, the suspension platform 306 includes a bottom plate 702 supporting ballast weight posts 704 disposed radially and holding a set of ballast weights 706. The bottom plate 702 also supports a set of mounting posts 710 connected by mounting rings 712 as shown. Wires or lanyards 714 that suspend the platform 306 are affixed to the mounting posts 710 between the mounting rings 712. The wires or lanyards 714 are connected to shock/vibration dampers, which are not shown in FIG. 7 for brevity. The wires or lanyards 714 may be made of steel or another suitable material.

A tip/tilt/rotation adjusting mechanism 708 is mounted to the bottom plate 702 for adjusting tip/tilt/rotation angle of a central adapter block 799, to which the observation equipment is mounted. The tip/tilt adjustment may be used to level the central adapter block 799 w.r.t. gravity, and the rotation or clocking angle adjustment may be used e.g. for polar alignment of the observation equipment 108. Different adapter blocks 799 may be configured for mounting different kinds or models of observation equipment on the suspension platform 306.

The suspension platform 306 serves at least two basic functions. In the transportation mode, the suspension platform 306 holds the observation equipment, which is suspended together with the suspension platform 306. In the observation mode, the suspension platform 306 rests on the extendable pier 210 and supports the observation equipment at a pre-defined and adjustable position and angle relative to the ground. For the transportation mode, it is important that the center of gravity (COG) of the suspension platform 306 with the mounted observation equipment is as close to the virtual suspension point (VSP) of the suspension platform 306 as possible. Thus, it is important to be able to adjust one relative to the other. The goal of the adjustment is to make the COG and VSP to be as close to each other as possible. When the COG and VSP are close enough, the jolts and shocks of the transportation do not case oscillations or tilts of the observation equipment 108 while in transport.

The COG position depends on the kind of observation equipment to be used. A height of the center adapter block 799 may be selected to make sure that a particular kind or model of the observation equipment, e.g. an astronomical mount with a telescope mounted thereon, has a proper COG position. To further adjust the COG position, including the lateral COG position, the ballast weights 706 may be added or removed as needed. Each ballast weight 706 may be between 1 kg and 3 kg, for example. To adjust the VSP position, one may vary the height at which the mounting rings 712 are affixed on the mounting posts 710. The height may be varied e.g. by +/−90 mm. Together, the counterweight posts 704, the ballast weights 706, the mounting posts 710, and the mounting rings 712 provide a mechanism for adjusting a position of the COG of the platform 306 with the observation equipment mounted on it, relative to the VSP of the platform 306. At least one part of the adjustment mechanism the COG or the VSP may be provided. Furthermore, the ballast weights 706 may be used to bring the total weight of the suspension platform 306 together with the mounted equipment to a pre-defined value that is optimal for the operation of the dampers 609.

Figure 8A:
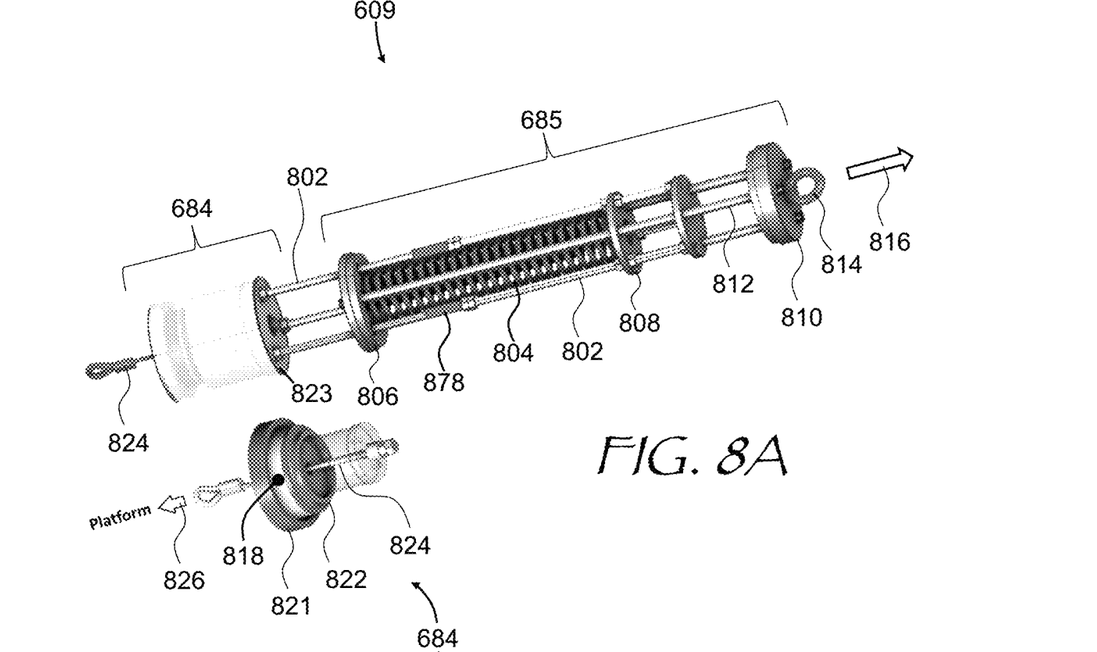
FIG. 8A is a three-dimensional view of a damper train used to suspend the platform of FIGS. 6 and 7.

Turning to FIG. 8A, the construction of the dampers 609 is shown in more detail. The vibration absorber 684 and the shock absorber 685 are serially coupled into a single damping train by means of connecting posts 802, which run through the shock absorber 685. Parallel oil damper(s), not shown for brevity, may also be provided to quench large-scale oscillations of the damping train.

The shock absorber 685 includes a compression spring 804 pressing on its opposed ends against an end plate 806 and an intermediate plate 808. A top plate 810 is rigidly coupled by connecting rods 812 to the end plate 806. When a coupling ring 814 mounted to the top plate 810 is pulled upon in a direction indicated by a first arrow 816, the compression spring 804 compresses between the end plate 806 and the intermediate plate 808, providing the required shock dampening function. In the example shown, the total travel of the shock absorber is approximately 230 mm (+/−115 mm from a nominal position), with the peak force generated of approximately 3250N. In some embodiments, side springs 878 may be provided on the connecting posts 802. The side springs 878 get activated when the compression spring gets compressed strongly during long displacements caused by very large shocks. The side springs 878 make the compression resistance of the shock absorber 685 progressive, with the spring constant increasing for very large displacements.

Figure 8B:
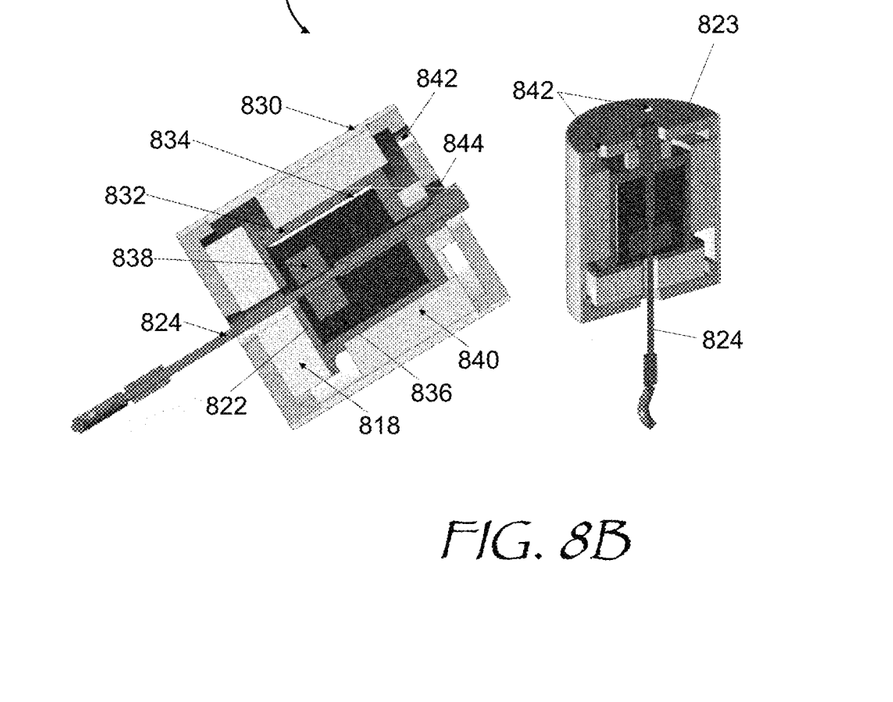
FIG. 8B is a 3D cutout view of the vibration absorber of the damper train of FIG. 8A.

The vibration absorber 684 includes a doughnut 818 of compressible polyurethane (PU) pressing against opposed first 821 and second 822 round plates. The compressive force is applied by a wire 824, e.g. a steel wire, passed through the center of the compressible PU doughnut 818 pulled in a direction indicated with a second arrow 826, which points opposite the first arrow 816. The wire 824 may be placed such as not to have a metal-to-metal contact anywhere along its length. The vibration absorber 684 is coupled to the connecting posts 802 at a third round plate 823 coupled to the first round plate 821 via an external shell body 830 (FIG. 8B). The compressible PU doughnut 818 may include several PU layers of differing density for better performance.

Referring to FIG. 8B, an example detailed construction of the vibration absorber 684 is illustrated. The vibration absorber 684 includes an inner cylinder body 832, and may include a compression cylinder 834 surrounding a pressurized PU filling 836 inside the inner cylinder body 832. The vibration absorber 684 may include a wire liner 838 in the pressurized PU filling 836 preventing a direct contact of the wire 824 with any metal part of the vibration absorber 684, and a packing layer 840 holding the inner cylinder body 832 inside the external shell body 830. The connecting posts 802 may be coupled to the external shell body 830 at threaded openings 842. The wire 824 may be anchored at a far end 844 of the inner cylinder body 832, causing the compressible PU doughnut 818 and pressurized PU filling 836 to work together for dampening vibrations. The packing layer 840 and the 838 wire liner 838 ensure that no vibration is conducted from one metal part to another. The vibration absorber 684 has been found to not only absorb transportation-related vibrations but also perform high-frequency, i.e. sharp or abrupt, shock absorption. The PU doughnut 818 in combination with the pressurized PU filling 836 has been found to smoothen shocks of up to 15G of magnitude, thereby reducing the risk of breakage of the wire 824 in case the chassis is stopped abruptly by unintentionally bouncing into a fixed object. The construction of the vibration absorber illustrated in FIG. 8B has been demonstrated to cancel 99.6% of all vibrations by forces as high as 3000N.

Figure 9:
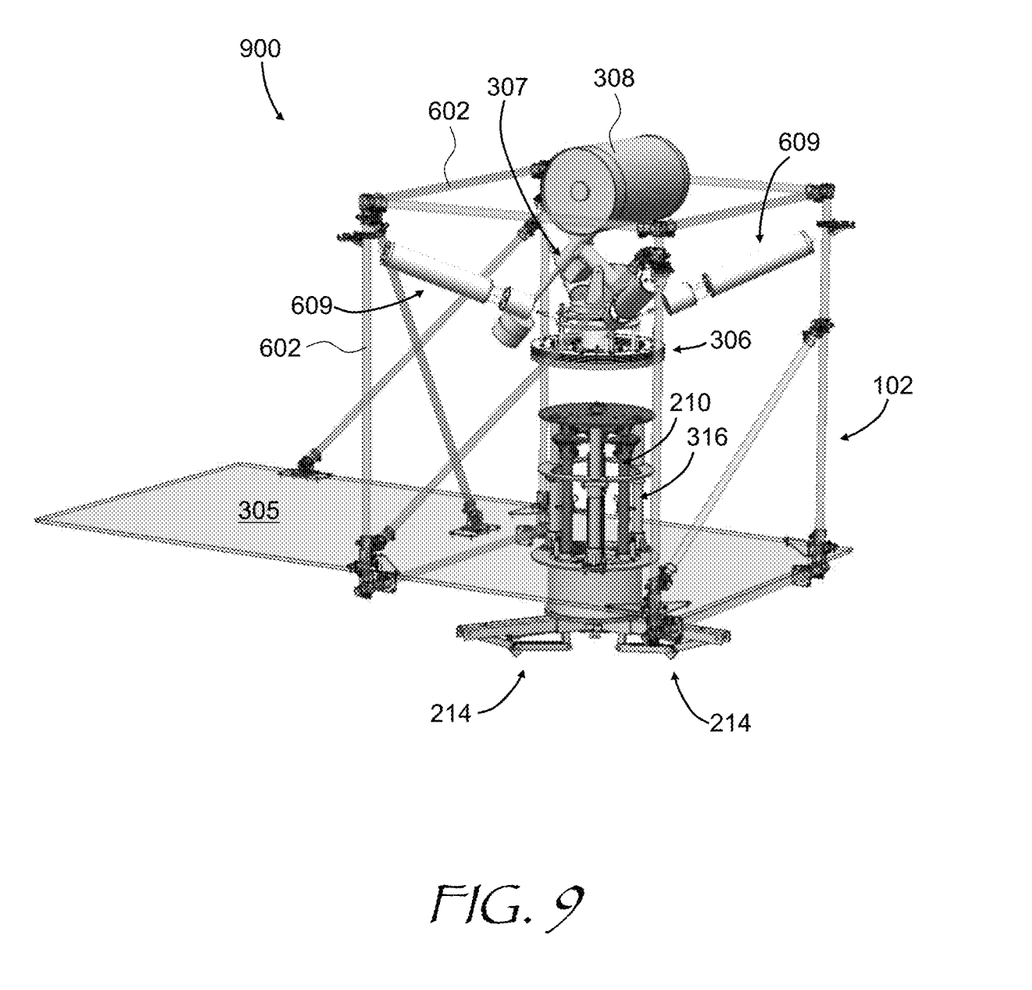
FIG. 9 is a three-dimensional view of an embodiment of the mobile observatory of FIG. 3 including the frame, the pier, and the suspension platform in the transportation mode.

Referring to FIG. 9, a mobile observatory 900 is an embodiment of the mobile observatory 100 of FIG. 1. The wheeled chassis and the outer walls have been omitted in FIG. 9 for brevity. The mobile observatory 900 includes the frame 102 built from interconnected horizontal, vertical, and diagonal posts 602. The frame 102 rests on the base floor 305 and supports the platform 306 suspended on four dampers 609 of FIG. 8. The platform 306 (FIG. 9) supports the mounted telescope 308. The extendable pier 210 rests on the base structure 316 mounted to the base floor 305. The mobile observatory 900 is shown in transportation mode, in which the platform 306 is suspended within the frame 102, and when the pier 210 is in the retracted position. During transportation, clutches of the telescope mount 307 may be released, and the telescope 308 may be immobilized with additional rubber straps, not shown.

Figure 10:
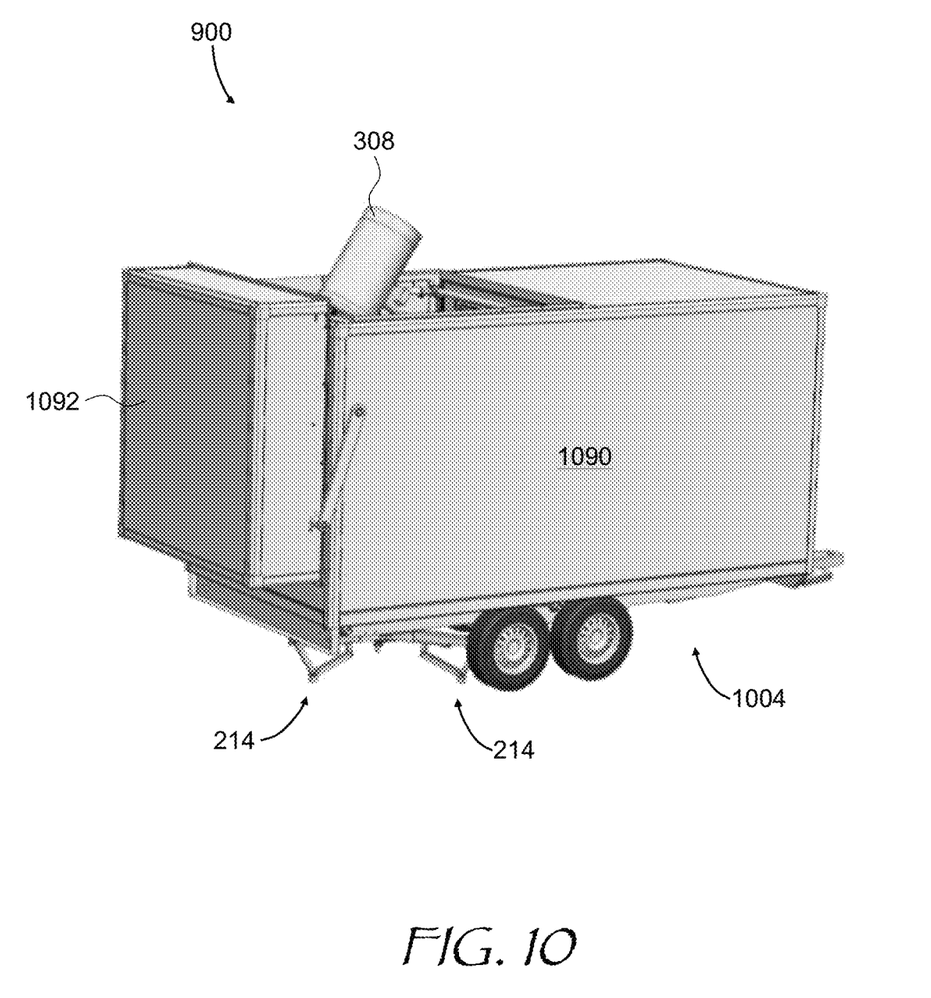
FIG. 10 is three-dimensional view of the mobile observatory embodiment of FIG. 9 in the observation mode.

In FIG. 10, the mobile observatory 900 is shown in the observation mode, with a wheeled chassis 1004 and outer walls 1090 explicitly illustrated. The mobile observatory 900 of FIG. 10 further includes a tilt-back roof 1092 providing a 360 degrees view for the telescope 308 when the tilt-back roof 1092 is opened in the observation mode, and sealing the telescope 308 or another kind of observation equipment from the road dust, dirt, and precipitation when transporting the equipment to the destination location in the transportation mode. The tilt-back roof 1092 may also remain closed in a third, "stationary" mode, which may be invoked e.g. to protect the observation equipment from the elements in case of long (multi-day) observations, rain or snow, direct sunlight, strong wind, etc. When in the stationary mode, the sealing provided by the based 215 pressed against the base floor 305 and the tilt-back roof 1092 in closed position can also prevent insects, mice, etc. from entering the mobile observatory 900.

The tilt-back roof 1092 can be driven between the open and closed positions by an external power tool such as a hand drill. A built-in motor may also be provided for powering the tilt-back roof 1092. The legs 214 are shown in FIG. 10 in the deployed position.

Figure 11:
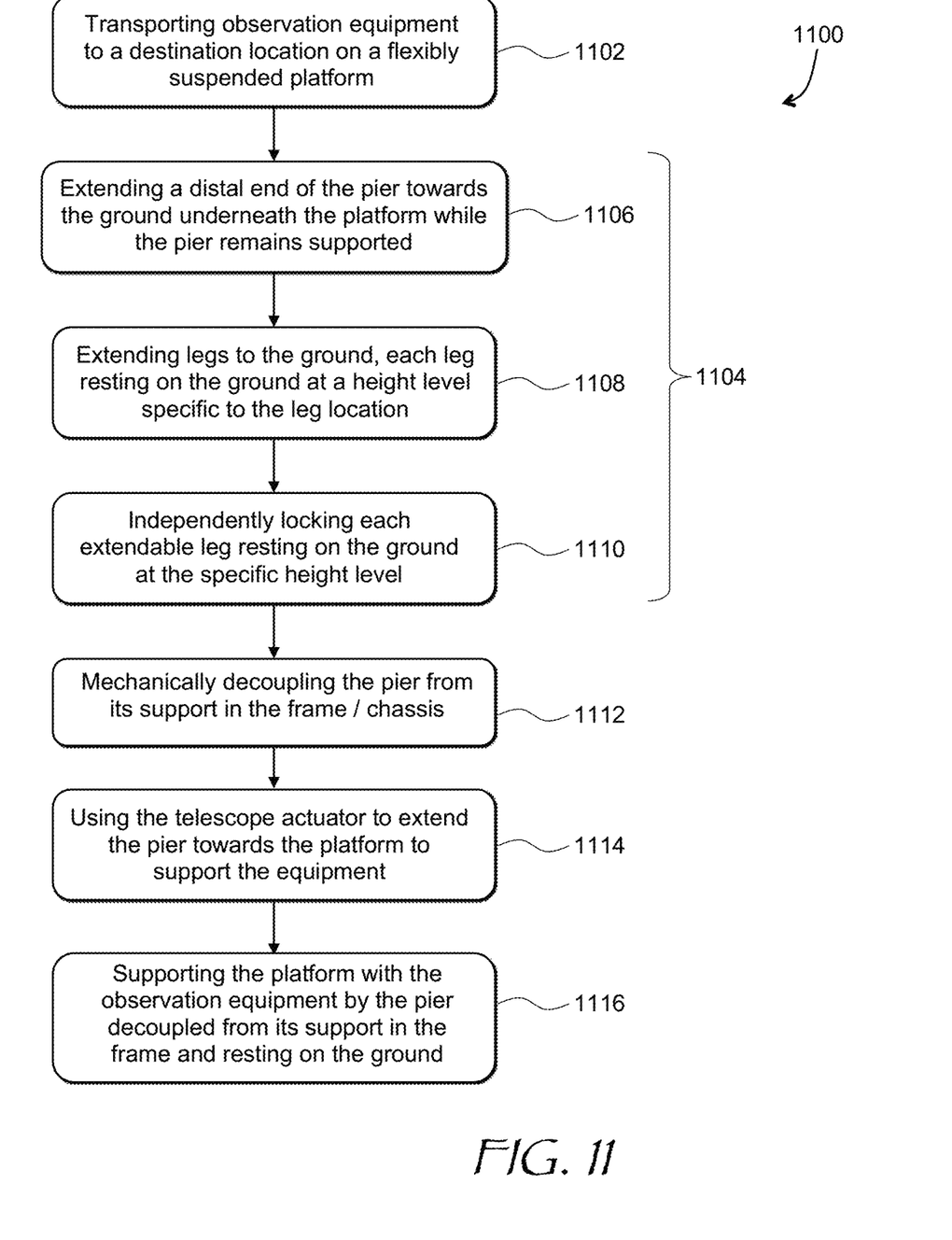
FIG. 11 is a flow chart of a method for using observation equipment in accordance with the present disclosure.

Turning now to FIG. 11 with further reference to FIGS. 2A to 2D, FIG. 3, FIG. 7, and FIG. 9, a method 1100 for using observation equipment includes transporting (FIG. 11; 1102) the observation equipment, such as a telescope a theodolite, a camera, etc., to a destination location on a platform, e.g. the platform 306 (FIGS. 7 and 9) flexibly suspended within a frame (102 in FIG. 9) mounted on a wheeled chassis (e.g. 104 in FIG. 1 or 1004 in FIG. 10). As noted above, the destination location may be any location, close or remote, that is accessible by driving and/or towing the wheeled chassis. A dark-sky site, a nature preserve, a construction site, an observatory site, a mountain, or a piece of land to be surveyed are only a few examples of possible destination locations for the observation equipment.

Upon arriving at the destination location, a pier supported in the frame, e.g. the pier 210 of FIGS. 2A to 2D, FIG. 3, FIG. 5, and FIG. 9, is coupled (1104) to ground under the platform 306. The process of coupling of the pier 210 to the ground 212 has been described above with reference to FIGS. 2A to 2D. Briefly, the telescopic actuator 202 may be used to extend (1106) the distal end 252 of the pier 210 towards the ground underneath the platform 106, while the pier 210 remains supported at the top. This is indicated in FIG. 2B showing the pier 210 being supported at the support locations 216, which may be provided by the frame 102, the wheeled chassis 104, or both. The extendable legs 214 may then be extended (1108) to the ground 212 (FIG. 2C). Each extendable leg 214 of the plurality of extendable legs independently rests on the ground 212 at a height level specific to a location of each extendable leg 214 on the ground 212. The locking mechanism of FIG. 5 may then be used (FIG. 11; 1110) to independently lock each extendable leg 214 of the plurality of extendable legs resting on the ground 212 at the specific height level (FIG. 2D). As noted above, the locking mechanism of each extendable leg 214 may be actuated by shift of the pier 210 under gravity when the pier 210 is decoupled from its support by the frame 102 and/or the wheeled chassis 104, e.g. by disengaging the detachable connector 248 that decouples the actuator 202 from the mounting surface 218 held at the support locations 216, this is illustrated in FIG. 2D. The pier 210 is thus decoupled (FIG. 11; 1112) from its support in the frame 102, and the telescopic actuator may be used (1114) to extend the pier 210 towards the platform 106 to support the platform 106 and the observation equipment 108 over the ground 212. The platform 106 may be supported (1116) together with the observation equipment 108 by the pier 210 decoupled from its support in the frame 102 and resting on the ground 212. It is noted that at this stage, the levelling of the tripod 210 does not need to be precise. The levelling depends on the levelling of the wheeled frame 104, on the degree to which simultaneous locking of all three legs 214 is achieved, on softness of the ground under each foot under each sole 465, etc. However, a precision levelling is not required because residual levelling errors may be offset by the tip/tilt/rotation adjusting mechanism 708 (FIG. 7). The tripod 210 only needs to be leveled to not tip over. For the teardown process, the steps of the method 1100 may be performed in a reverse order.

Following is a non-limiting example of implementation of the method 1100 in application to the mobile observatory disclosed herein.

Locked and sealed state in transportation mode: in this state, the actuator 202 is pulling the tripod base 215 up against the base floor 305 and the mounting surface 218 pressing onto the posts of the base structure 316 (FIG. 9). The tripod base 215 and the mounting surface 218 are pulled towards each other, sealing the base floor 305 from dust and moisture of the road under the base floor 305. This corresponds to the transporting step 1102 of the method 1100, and to the initial position of the pier 210 illustrated in FIG. 2A.

Partial release in preparation for legs unfolding: in this state, the actuator 202 extends and thereby lowers the tripod 217 down towards the ground 212 (FIG. 2B). The entire pier 210 including the tripod 217 (FIG. 2B) are hanging on the connector 248 attached to the mounting surface 218 resting on the base structure 316. It is noted that in this state, the tripod base 215 is already disconnected from the trailer 100. This corresponds to the extending step 1106 of the method 1100.

Legs unfolding: in this state, the central winch or spool 570 unwinds the three leg cords or wires 572 (FIG. 5A), causing the legs 214 of the tripod 217 to drop down until hitting the ground individually. The tripod 217 remains leveled, as long as the trailer 100 is parked in a leveled position. This corresponds to the legs extending step 1108 of the method 1100, and FIG. 2C.

Drop-lock anchoring: in this state, the connector is released causing the pier 110 to drop downwards, typically at a weight of over 100 kg. This in turn causes the legs' 214 locking mechanisms to activate. The tripod 217 stays leveled, but now it is anchored to the ground. This corresponds to the locking step 1110 of the method 1100, and to FIG. 2D.

Readiness for observation mode: in this state, the actuator 202 expands and thereby lifts the mounting surface 218 and docks it on to the free hanging platform 306. The platform 306 is thereby disconnected from the trailer 100 and the observation equipment is supported over the ground. This corresponds to the extension step 1114 and the supporting step 1116 of the method 1100.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A mobile observatory comprising:
    a frame mountable on a wheeled chassis for transporting the frame to a destination location;
    a platform forcibly suspendable within the frame, wherein the platform is configured to support observation equipment in a transportation mode to the destination location; and
    a pier detachably supportable by at least one of the frame or the wheeled chassis and configured to:
        extend to ground under the platform at the destination location while being supported;
        decouple from the frame or the wheeled chassis; and
        support the platform over the ground in an observation mode;
    the pier comprising a plurality of extendable legs at a distal end of the pier, the plurality of extendable legs being configured to independently contact the ground and support the pier on the ground after the pier has been decoupled from the frame or the wheeled chassis in the observation mode, each extendable leg comprising a locking mechanism for independently locking the extendable leg after contacting the ground, the locking mechanism comprising a tilt-back lever actuated by a downward force applied by the pier to the extendable leg when the pier shifts down under gravity upon releasing from being supported by the frame or the wheeled chassis.

2. The mobile observatory of claim 1, wherein the pier further comprises:
    a mounting surface at a proximal end of the pier, for supporting the platform in the observation mode; and
    a telescopic actuator for changing a length of the pier between the proximal and distal ends thereof.

3. A mobile observatory comprising:
    a frame mountable on a wheeled chassis for transporting the frame to a destination location;
    a platform flexibly suspendable within the frame, wherein the platform is configured to support observation equipment in a transportation mode to the destination location;
    a pier detachably supportable by at least one of the frame or the wheeled chassis and configured to:
        extend to ground under the platform at the destination location while being supported;
        decouple from the frame or the wheeled chassis; and
        support the platform over the ground in an observation mode; and
    a plurality of dampers for suspending the platform in the frame when in the transportation mode;
    each damper of the plurality of dampers comprising serially coupled a vibration absorber for absorbing vibrations and a shock absorber for absorbing shocks, wherein one of the vibration absorber or the shock absorber is coupled to the platform, and the other of the vibration absorber or the shock absorber is coupled to the frame.

4. The mobile observatory of claim 3, wherein the platform comprises an adjustment mechanism for adjusting a position of a center of gravity of the platform with the observation equipment mounted thereon relative to a virtual suspension point of the platform when the platform is suspended by the plurality of dampers.

5. The mobile observatory of claim 3, wherein the vibration absorber comprises:
    an external shell body;
    an inner body within the external shell body;
    a compressible layer supporting the inner body within the external shell body; and
    a supporting wire coupled to the inner body and running through the compressible layer and the inner body.

6. The mobile observatory of claim 1, further comprising the wheeled chassis, wherein the frame is mounted on the wheeled chassis.

7. A self-adjustable support for supporting observation equipment over ground, the self-adjustable support comprising:
    a pier configured for being held over the ground at a controllable distance therefrom; and
    a plurality of extendable legs at a distal end of the pier, wherein the extendable legs of the plurality of extendable legs are configured to independently contact the ground and support the pier after the pier is released from being held over the ground, each extendable leg comprising a locking mechanism for independently locking the extendable leg upon contacting the ground, the locking mechanism comprising:
        a tilt-back lever actuated by application of force from the pier when the pier shifts down under gravity;
        a supporting member having a groove therein;
        a sliding block coupled to the tilt-back lever, for sliding in the groove of the supporting member; and
        a locking block coupled to the sliding block for locking the locking block and the sliding block within the supporting member when the force is applied to the tilt-back lever.

8. A self-adjustable support for supporting observation equipment over ground, the self-adjustable support comprising:
    a pier configured for being held over the ground at a controllable distance therefrom;
    a plurality of extendable legs at a distal end of the pier, wherein the extendable legs of the plurality of extendable legs are configured to independently contact the ground and support the pier after the pier is released from being held over the ground, each extendable leg comprising a locking mechanism for independently locking the extendable leg upon contacting the ground, the locking mechanism comprising a tilt-back lever actuated by application of force from the pier when the pier shifts down under gravity; and
    a spring-loaded pullback mechanism for facilitating the extension of each extendable leg of the plurality of extendable legs to the ground.

9. A self-adjustable support for supporting observation equipment over ground, the self-adjustable support comprising:

a pier configured for being held over the ground at a controllable distance therefrom;

a plurality of extendable legs at a distal end of the pier, wherein the extendable legs of the plurality of extendable legs are configured to independently contact the ground and support the pier after the pier is released from being held over the ground, each extendable leg comprising a locking mechanism for independently locking the extendable leg upon contacting the ground, the locking mechanism for comprising a tilt-back lever actuated by application of force from the pier when the pier shifts down under gravity; and a spool for unlocking the locking mechanism and retracting each one of the plurality of extendable legs when the pier is lifted over the ground, by pulling on the tilt-back levers of the extendable legs of the plurality of extendable legs.

10. A method for using observation equipment, the method comprising:

transporting the observation equipment to a destination location on a platform of a mobile observatory, wherein the platform is flexibly suspended within a frame mounted on a wheeled chassis of the mobile observatory;

upon arriving at the destination location;

using a telescopic actuator of a pier to extend a distal end of the pier towards ground underneath the platform while the pier remains supported by at least one of the frame or the wheeled chassis;

extending a plurality of extendable legs at the distal end of the pier to the ground, wherein each extendable leg of the plurality of extendable legs independently rests on the ground at a height level specific to a location of each extendable leg on the ground; and using a locking mechanism to independently lock each extendable leg of the plurality of extendable legs resting on the ground at the specific height level, by engaging a tilt-back lever actuated by downward force applied by the pier to the extendable leg when the pier shifts down under gravity upon releasing from being supported by the at least one of the frame or the wheeled chassis.

11. The method of claim 10, further comprising:

decoupling the pier from its support in the frame; and supporting the platform with the observation equipment by the pier decoupled from its support in the frame and resting on the ground under the mobile observatory.

12. The method of claim 10, further comprising:

upon actuating the locking mechanism, using the telescopic actuator to extend the pier towards the platform to support the platform and the observation equipment on the platform of the mobile observatory.

\* \* \* \* \*

UNITED STATES PATENT AND TRADEMARK OFFICE
CERTIFICATE OF CORRECTION

| | | |
|---|---|---|
| PATENT NO. | : 11,306,864 B1 | Page 1 of 1 |
| APPLICATION NO. | : 17/372642 | |
| DATED | : April 19, 2022 | |
| INVENTOR(S) | : Anders Hjelset | |

It is certified that error appears in the above-identified patent and that said Letters Patent is hereby corrected as shown below:

In the Claims

Column 13, Line 22, "a platform forcibly suspendable within the frame" should read -- a platform flexibly suspendable within the frame --

Column 15, Line 25, "upon arriving at the destination location;" should read -- upon arriving at the destination location: --

Signed and Sealed this
Tenth Day of June, 2025

Coke Morgan Stewart
*Acting Director of the United States Patent and Trademark Office*